United States Patent Office 3,494,760
Patented Feb. 10, 1970

3,494,760
PRODUCTION OF METAL AND ALLOY PARTICLES BY CHEMICAL REDUCTION

Paul Ginder, Lakewood, Calif., assignor, by mesne assignments, to Burton Electrochemical Co., Inc., Los Angeles, Calif., a corporation of California

No Drawing. Filed Sept. 28, 1967, Ser. No. 671,210
Int. Cl. B22f *9/00*
U.S. Cl. 75—.5 9 Claims

ABSTRACT OF THE DISCLOSURE

A method of forming uniform micro size particles of cobalt and cobalt alloys is disclosed. The particles are formed by spontaneous chemical reduction of the metal salts in the presence of a reducing salt, using seed particles to initiate the reduction. The seed particles are formed by catalyzing the reduction of the same metal salts in the presence of the same reducing salt, using dissolved palladium chloride as the catalyst. The initial catalytic reaction particles are discarded and not used as seed particles. When the desired particle size is obtained, the spontaneous reduction process is stopped by drowning the reduction solution in water.

The present invention relates to the manufacture of uniform micro-size particles of metals and alloys by chemical reduction from solution. It is expected that the primary value of the present invention is to be found in the production of magnetic materials, as for example magnetic recording tapes and molded magnetic cores for various purposes, because uniformity and size of the particles significantly affect the magnetic properties of these materials. In this connection, the invention is particularly useful when applied to magnetic cobalt alloys, since no effective, efficient and useful process has heretofore been available for the production of uniform and controlled micro-size cobalt alloy particles. The following description of the invention is therefore related particularly in terms of cobalt alloy magnetic powders, but it is understood that the invention is applicable to other magnetic metals and alloys, including such metals as nickel, iron and alloys thereof, and is indeed applicable to a large variety of metals and alloys whether magnetic or not, as will be apparent to those skilled in the art.

Current practice in the manufacture of magnetic recording tapes is to utilize a substrate film of Mylar (polyethylene terephthalate), and to apply to the film a coating of ferromagnetic particles in a settable binder vehicle. The ferromagnetic particles are usually either an iron oxide or ferrite powder.

These ferromagnetic materials, however, leave much to be desired in this application. Several important factors in evaluating a magnetic recording medium are the coercive force of the magnetic material, the thickness of the magnetic coating, its magnetic remanence, and the squareness of its hysteresis loop. The coercive force should be high, so that fluxes emanating from adjacent magnetic bits will have little effect upon each other; the magnetic layer should be very thin to provide a finely resolved magnetic spot, so that the flux emanating from the magnetic recording head will not spread out in the magnetic medium; the remanence should be high, so that a maximum amount of flux will be obtained in the read-out process; and the hysteresis loop should be as square as possible to minimize loss of recorded energy when the applied magnetic field is removed. The iron oxide normally used in recording tapes possesses generally poor characteristics, in that its coercive force is low (about 200 to 260 oersteds), the hysteresis loop is not square, remanence is low, and the coatings required are therefore thick. On the other hand, cobalt and cobalt alloy magnetic materials can possess higher coercive force properties (in excess of 600 oersteds), a much squarer hysteresis loop, and much higher remanence so that thinner layers of the material can be utilized.

However, to effect these results and obtain a desirable magnetic cobalt-binder coating on recording tape, it is necessary to produce the cobalt or cobalt alloy powder in a micro, uniform and controlled particle size. Heretofore it has not been known how to effect these results in a practical and effective way. The present invention accomplishes this objective. Basically, the present invention utilizes chemical reduction of salts in solution, to produce the metal or alloy desired. For this purpose a solution is used of the type employed to form metal coatings on substrates by chemical reduction, known in the art as electrodess coating baths. However, the bath is used in a way to obtain a precipitate of the metal or alloy powder, rather than a coating deposit. The bath is catalyzed into a spontaneous reduction of the metal salt, under conditions and procedures that are designed to control the spontaneous reaction and obtain micro size particles of the metal precipitate that are extremely uniform in particle size. If the precipitate is a magnetic metal, such as cobalt, or a magnetic alloy such as cobalt-nickel-iron, the resultant powder may be used to form an exceptionally effective magnetic recording tape pursuant to the characteristics above-defined; or the particles may be molded with a binder into a magnetic core shape.

It is accordingly one object of the present invention to provide for the production of micro and uniform size metal and metal alloy particles.

Another object of the present invention is to provide for the production of such particles by chemical reduction of metal salts from solution.

Still another object of the present invention is to provide for the production of micro and uniform size particles of magnetic metals and alloys, particularly cobalt, and alloys of cobalt with such metals as nickel, iron, and phosphorus.

Other objects and advantages of the present invention will be apparent to those skilled in the art after consideration of the present description thereof. In order to facilitate a complete understanding of the invention, the following detailed specific example is presented for illustrative purposes. It is understood, however, that the example is only exemplary of the preferred embodiment and is not by its specificity intended to imply any limitations upon the scope of the invention.

One illustrative aqueous reduction bath that may be utilized in parcticing the present invention to produce a cobalt-nickel-iron alloy powder is set forth:

| | | |
|---|---|---|
| Cobalt sulfate | g./l. | 30.0 |
| Nickel sulfate | g./l. | 4.0 |
| Iron sulfate | g./l. | 0.8 |
| Potassium citrate | g./l. | 10.0 |
| Sodium hypophosphite | g./l. | 15.0 |
| Potassium sodium tartrate | lbs./l. | 1.5 |

Ammonium hydroxide q.s. to provide a pH of 9.0.

The water used to make the bath is preferably deionized water.

A catalyst solution is prepared containing:

| | | |
|---|---|---|
| Palladium chloride | g./l. | 1.2 |
| Hydrochloric acid (conc.) | ml./l. | 40 |

Deionized water q.s. one liter.

The reduction bath is heated to 180° F. and filtered. Then a seeding solution is prepared by taking a small portion of the reduction bath, preferably about 0.1% and combining it with the catalyst solution in the volumetric ratio of about ten parts of reduction bath to one part of catalyst solution. The resultant mixture, is heated to about 180° F., and reduction occurs to produce cobalt-nickel-iron metal alloy particles. This reaction is permitted to continue for about 30 seconds, and the solution is then filtered through a coarse filter, such as #56 filter paper, to remove the coarser or larger particles formed by the decomposition, leaving in the filtrate only the solution and the very fine particles that are continually being developed. With the reduction bath maintained at 180° F., this filtrate is used as a seeding solution by promptly adding it to the reduction bath with vigorous agitation, while maintaining the bath at a pH of about 9 by addition of ammonia as required. The seeding solution causes the reduction bath to start decomposition spontaneously. The start of this decomposition is marked by the beginning of a gassing action. It appears that the reduction process takes place by deposit of the metal primarily upon the seed particles obtained from the seeding solution. Ultimate particle growth is a function of bath temperature, composition and pH, and of elapsed time from the start of reduction.

With the compositions hereinabove defined, and maintaining a bath pH of about 9.0 at all times, it is found that an elapsed time of about one minute from addition of the seeding solution to the reduction bath will provide a precipitate of particles which are a fraction of a micron in size, ranging between about 3 and 12 microninches. An important factor in obtaining this uniformity of particle size is instantaneous cessation of the reduction or decomposition process. This result is accomplished after the desired reduction time has elapsed by dumping the entire bath into a large volume of cold deionized water, of about four or more times the volume of the bath.

After this drowning of the reduction bath, the particles are cleaned by agitation and then separated by filtration. The particles may be further purified by continued rinsing through the filter.

The magnetic properties of the resultant powder may be controlled in the foregoing process by their alloy composition, and by particle size. The resultant particles may have their magnetic properties modified by heat treatment and by mechanical treatment, such as by ball milling, as is understood in the art. Particle size uniformity may of course be further refined by various size classification techniques, as are also well known.

As suggested previously herein, the magnetic particles produced in accordance with this invention embody a particle size uniformity that makes them particularly useful in a binder coating for magnetic recording tape. Further, it is apparent that these particles may be combined with a molding binder to form magnetic cores for various purposes, as well as read and write heads for magnetic recording and data storage purposes.

Cobalt alloy particles can be produced with the procedures of this invention having fixed values of less than 1 oersted to more than 600 oersteds, and of less than 1,000 gauss to more than 12,000 gauss. Also, uniform particle sizes can be obtained to a size of less than 300 angstroms.

From the foregoing specific example of the invention it will be appreciated that in the formation of the seeding solution or mixture, the concentration of catalyst when mixed with a portion of the reduction bath, is sufficient to initiate reduction of the metal salts. By permitting the reaction to proceed for a short period of time, the more violent phase of the reaction is passed, and the irregularly sized particles resulting therefrom are removed. As a result, the residual seeding solution contains only those metal particles that were formed during the later phase of the reaction, and they are substantially uniform in size. When this filtrate is then added to the bulk of the reduction bath, the extremely small and uniform speed particles of reduced metal provide the nuclei for spontaneous reduction of the metal salts to form the metal. This latter reaction is therefore controlled in nature and not violent, enabling controlled and uniform growth of the seed nuclei.

The foregoing illustrative specific example of the invention is presented merely as a preferred mode of carrying out the process, and it is not intended that the invention be construed as limited thereto. Obviously, other metal salts, catalysts, and concentrations than those described can be used, and different bath temperatures and pH's can likewise be employed. The invention is applicable to any electroless plating bath wherein spontaneous reduction of the metal salts can be effected by seeding, and particularly wherein the seed developing reaction can be initiated by means of a catalyst, as herein described. Accordingly, such modifications and variations of the disclosure as are embraced by the spirit and scope of the appended claims are contemplated as being within the purview of the invention.

What is claimed is:

1. A method of forming a powdered metal or metal alloy of controlled particle size comprising the steps of, mixing a first solution containing a reducible metal salt and a reducing agent dissolved therein with a second solution having dissolved therein a salt of a metal catalyst for catalyzing the reduction of said reducible metal salt by said reducing agent, at a temperature which initiates the reduction reaction, permitting said reduction to proceed only to partial completion, removing the larger particles of metal formed therein from the mixture to provide a residual seeding mixture, mixing the seeding mixture with an additional quantity of solution containng said reducible metal salt and a reducing agent at a pH and temperature which effects a spontaneous reduction of the reducible salt therein and deposit of the metal thereof on the seed particles of said residual seeding mixture, and stopping said reduction by sudden dilution of the mixture.

2. A method as set forth in claim 1, wherein said first solution and said additional quantity of solution are electroless plating solutions.

3. A method as set forth in claim 1, wherein said reducible metal salt includes a salt of a metal selected from the group of cobalt, nickel, and iron.

4. A method as set forth in claim 3, wherein said catalyst is a noble metal.

5. A method as set forth in claim 1, wherein said reducible metal salt includes a salt of cobalt and an additional reducible metal salt.

6. A method as set forth in claim 4, wherein said additional reducible metal salt includes a salt of a metal selected from the group of nickel and iron.

7. A method as set forth in claim 4, wherein said additional reducible metal salt includes a salt of nickel and iron.

8. A method as set forth in claim 1, wherein said first solution includes salts of cobalt, nickel, and iron at a pH of about 9, said second solution includes a salt of palladium at an acid pH, and the mixture of said seeding mixture with the reducible metal salt solution is maintained at a pH of about 9 and a temperature of about 180° F. during the reaction time.

9. A method as set forth in claim 8, wherein said first solution includes a hypophosphite salt.

References Cited

UNITED STATES PATENTS

| | | | |
|---|---|---|---|
| 2,853,374 | 9/1958 | Schulfelberger | 75—.5 |
| 2,863,762 | 12/1958 | Pullen | 75—108 |

L. DEWAYNE RUTLEDGE, Primary Examiner

W. W. STALLARD, Assistant Examiner

U.S. Cl. X.R.

75—108, 109, 121